Figure 1:
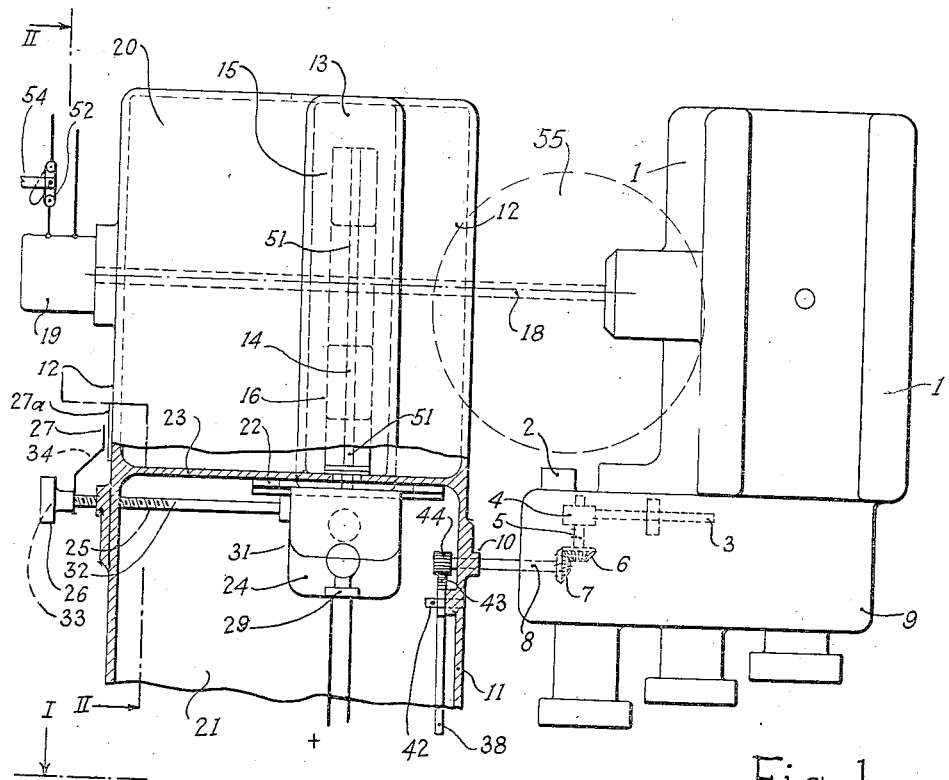

March 23, 1937.                     O. A. ROSS                     2,074,516
                           SOUND RECORDING APPARATUS
                              Filed June 10, 1936

INVENTOR
Oscar A. Ross.

Patented Mar. 23, 1937

2,074,516

UNITED STATES PATENT OFFICE 2,074,516

SOUND RECORDING APPARATUS

Oscar A. Ross, New York, N. Y.

Application June 10, 1936, Serial No. 84,594

25 Claims. (Cl. 179—100.3)

This invention relates to the photographic recording of sound synchronized with action and more particularly to that class commonly known as "talking movies."

When photographically recording motion pictures, it is the practice to "fade in" and "fade out" scenes of action to produce a more pleasing presentation to an audience. Such fade ins and fade outs are accomplished by certain mechanism associated with motion picture cameras and one of the objects of this invention is to associate the aforesaid mechanism with a fade in and fade out mechanism of a sound recording camera whereby the sound and action records are faded in and faded out in synchronism. A positive print motion picture film having such synchronized fade ins and fade outs is shown in my copending application Ser. No. 236,980, filed December 1st, 1927.

Another object of this invention is to furnish apparatus for recording sound onto selected sound tracks of a multiple track sound film and indicate the track onto which the sound is being recorded.

Another object of the invention is to furnish apparatus for recording sound onto selected tracks of a multiple sound track sound film, selectively light fogging said sound tracks and indicating the sound track being light fogged.

Another object of the invention is to furnish apparatus for recording sound onto light sensitive film wherein the sound track onto which said sound is recorded is pre-exposed sufficiently whereby the exposure during the recording of the sound lies within the substantially straight portion of the exposure curve of the particular film onto which said sound is recorded.

Another object of the invention is to effect said pre-exposure by means of a light source which is also utilized for variably exposing said sound track for the purpose of fading the sound record thereon in and out at desired locations.

Another object of the invention is to furnish novel and peculiar structure for the accomplishment of said constant pre-exposure and said variable exposure of photographically recorded sound records, said novel and peculiar structure being included as a part of a sound recording camera having a light valve for projecting modulated light onto said light sensitive film, said modulated light corresponding to sound.

Another object is to furnish sound motion picture apparatus wherein the action recording camera and the sound recording camera are spaced and advance independent action and sound films, said cameras being operatively connected for synchronously advancing said films.

Another object is to furnish a sound recording camera wherein the film reel housing and the film advancing housing are made as separate units whereby the sound recording camera may be quickly re-loaded with fresh film.

Another object is to furnish an independent sound recording camera wherein all the operating parts are completely housed with the exception of indicators for indicating the position of the film with respect to the sound recording unit.

Other objects and advantages will appear as the description of the invention progresses, and the novel feature of the invention will be pointed out in the appended claims.

This invention consists in the novel construction and arrangement of parts hereinafter described, delineated in the accompanying drawing, and particularly pointed out in that portion of this instrument wherein patentable novelty is claimed for certain and peculiar features of the apparatus, it being understood that, within the scope of what hereinafter thus is claimed, divers changes in the form, proportions, size and minor details of the structure may be made without departing from the spirit of, or sacrificing any of the details of the invention.

In describing the invention in detail, reference is had to the accompanying drawing, wherein I have illustrated embodiments of my invention, and, wherein like characters of reference designate corresponding parts throughout the several views, and in which:—

Figure 2:
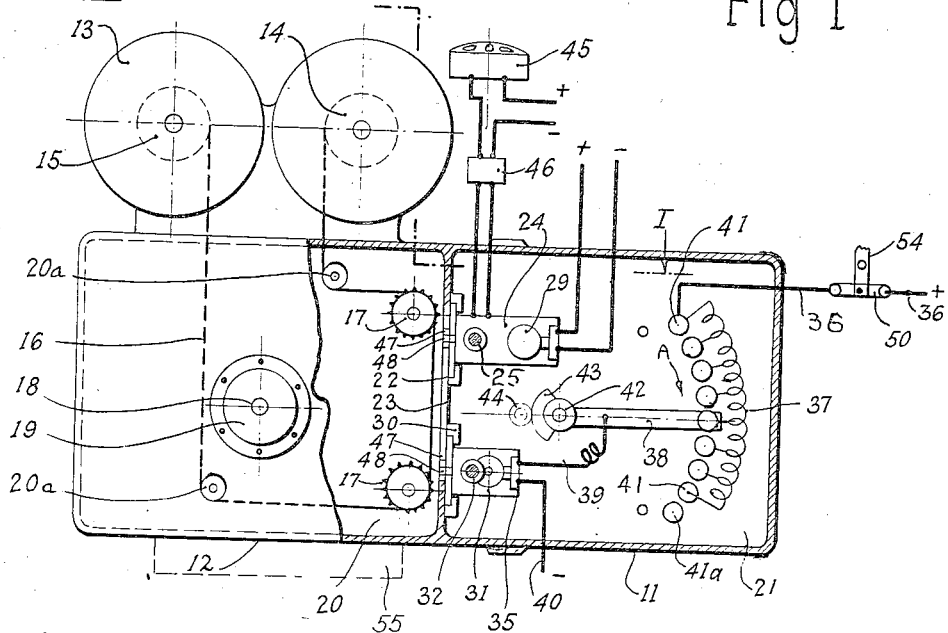

Figure 1 is a top part plan, part sectional, part diagrammatic view of one embodiment of the invention taken on line 1—1 of Fig. 2 and Fig. 2 is a side part plan, part sectional and part diagrammatic view of the same taken on line 2—2 of Fig. 1.

Referring to Figures 1 and 2, motion picture camera 1, shown preferably as a standard motion picture camera, is equipped with a dissolve mechanism of known form for producing fade in and fade out effects, the control button 2, when rotated in one direction producing a fade in, and in the other a fade out, when said fade ins and fade outs are affected, a certain gear 3 is caused to rotate, in one direction for fade in and in the other for fade out.

One form of applicant's invention comprises the addition of a pinion 4 secured to shaft 5 operating in suitable bearings (not shown) in camera 1, said pinion meshing with gear 3.

To one end of shaft 5 is secured a bevel pinion 6 meshing with a similar pinion 7 at right angles thereto secured to shaft 8 supported by and extending through turret 9 to bearing 10 of housing 11 of sound recording camera 12, having film magazine 13 detachably secured thereto, said magazine having film feed reel 15 and take up reel 14 supporting sound record film 16 advanced by film guide sprockets 17—17 suitably geared to and driven by shaft 18 operated by motor 19, said shaft being arranged to operate the sound recording camera 12 and action recording camera 1 in synchronism, whereby the sound record film 16 and the action record film in camera 1 are advanced at the same rate of speed, or in constant proportionate rates of speeds thereof one to the other depending upon the reproducing apparatus in which said films are to be jointly exhibited.

Sound recording camera 12 comprises in part film advancing housing 12a having chamber 20. To housing 12a is suitably secured mechanism housing 11 having chamber 21. Trackways or rail portions 22 formed on wall 23 of housing 12a are arranged to adjustably support sound recording light valve unit 24, said unit having mating portions slidable on said rails, the movement of said unit being transversely with respect to the advancement of sound film 16, a suitable screw 25 rotated by handle 26 supporting indicator 27 operating over dial 27a being arranged to position said unit with respect to said film for recording sound records onto a selected sound track of said film. Light valve unit 24 includes a light source 29, the light from which is modulated by light valve and optical system unit 61 in response to sound directed into microphone 45, said modulated light being projected as an attenuated light beam onto film 16. Unit 24 is also formed with a male portion 47 extending through an opening in wall 23, said male portion having a light slit 48 through which said modulated light is projected onto film 16. Said male portion is arranged to be moved in said opening without permitting the entrance of extraneous light to film 16.

Also formed on wall 23 is a second trackways or rails 30 arranged to adjustably position light projecting or fogging unit 31 transversely with respect to the advance of film 16. Said unit is also arranged to be moved by screw 32 having operating handle 33 supporting indicator 34 operating over a dial similar to dial 27a, the rotation of said screw acting to position said fogging unit 31 relatively transversely with respect to film 16 for light fogging a selected sound track thereon and simultaneously indicating the track being fogged. Fogging, or exposure unit 31 includes a light source 35, the energy to which flows from wire 36, switch 50 rheostats 37 and 37a, contact lever 38 and wire 39, the energy from said light source returning to the energy source through wire 40. Lever 38 pivoted on stud 42, is formed with sector portion 43 meshing with pinion 44 secured to shaft 8. Upon rotation of shaft 8 lever 38 is constrained to pass over and contact with the several contacts 41 and 41a forming part of rheostats 37 and 37a, thereby cutting resistance in and out in series with light source 35 for varying the light intensity thereof.

Sound directed into microphone 45 is suitably amplified by translating or gain unit 46, the output of which energizes the light valve of light valve and optical system unit 61 supported by sound recording unit 24 for modulating the light projected by light source 29, said modulated light being projected through light slit 48 by said optical system for recording said sound onto film 16.

Light fogging or exposure unit 31 is also supplied with a male portion 47 extending through another opening in wall 23 to the light sensitive face of film 16, said male portion including a light slit 48 through which the light from light source 35 is projected onto said film. Said male portion 47 is likewise movable in said opening transversely with respect to the advance of said film.

The resistance of rheostat 37a connected between contacts 41 and 41a may be varied by adjustment of contact lever 38a independently of the contact lever 38, whereby light source 35 will project light of constant intensity after lever 38 has reached contact 41a and remains thereon.

Motion picture camera 1 and sound recording camera 12 are assumed to be in the process of recording a dissolve or "fade in" in both of cameras 1 and 12, the lever 38 of sound recording camera 12 moving in the direction of arrow A whereby resistance of rheostat 37 is being cut in and the intensity of light source 35 is being decreased.

Before placing cameras 1 and 12 in service, lever 38 is normally contacting with the highest contact 41 whereby light source 35 will project maximum light to fog or exposed film 16 upon closing switch 50, as said film advances toward the sound recording unit. Said maximum light fogging is sufficient to prevent the recording of any reproducible sound by the modulated light projected by the sound recording unit 24 as said modulated light is exposed over said fogged area. As long as lever 38 remains in contact with the uppermost contact 41, film 16 will receive a constant maximum exposure as it advances, the portion of track 51 so exposed being substantially opaque to light when said film is developed.

After cameras 1 and 12 have been placed in service by energizing motor 19 and it is desired to record a scene including action and sound, the dissolve button 2 is rotated to the "fade in" position. As this occurs gear 3 is set in motion thereby causing shafts 5 and 8 to be rotated. Upon rotation of shaft 8 lever 38 begins to move downwardly over successive contacts 41 until the lowest or constant exposure contact 41a is reached, whereupon said lever stops and the "fade in" of the sound record has been completed, this usually being accomplished during the advancement of approximately 4 feet of sound film.

As lever 38 moves downwardly over contacts 41 the resistance of rheostat 37 is gradually included in series with light source 35 thereby gradually diminishing the light intensity of the light therefrom projected through light slit 48 onto sound track 51. As lever 38 engages contact 41a the resistance 37a is included, this resistance being proportioned to energize light source 35 to continuously expose light track 51, this exposure corresponding substantially to the toe of the H and D exposure curve of the particular film onto which the sound is being recorded whereby the sound record recorded by the modulated light projected by sound recording unit 24 will be recorded within the straight line portion of said H and D curve thereby permitting a more faithful recording and reproduction of said sound. The adjustment of resistance in rheostat 37a by contact lever 38a permits adjusting the constant value of pre-exposure of a sound track prior to the recording of the sound thereonto by the sound recording unit 24 whereby said pre-exposure may be adjusted to a constant value for differing emulsions on a sound film as 16.

Upon the termination of said scenes the control button 2 is rotated to the "fade out" position whereupon gear 3 and shafts 5 and 6 are oppositely rotated whereupon lever 38 gradually ascends and gradually cuts out rheostats 37a and 37 and whereupon the energy to light source 35 will be gradually increased thereby gradually increasing the light intensity of light source 35 as film 16 advances and thereby producing a "fade out" which will be completed when said lever 38 has reached the uppermost contact 41 and whereafter a maximum fogging of sound track 51 will again occur during the advancement of film 16 and until the switches 50 and 52 are open for discontinuing cameras 1 and 12 from service. It is to be noted that said switches are connected by a common rod 54 whereby both of said switches may be operated simultaneously.

Since the sounds recorded by sound recording unit 24 is photographically superimposed on the same portion of the film which is photographically faded by the light fogging or exposure unit 31 said sound will be faded in and out when said film or a print thereof is advanced for reproducing said sound as more fully described in said copending application Serial No. 236,980 filed December 1, 1927.

It is to be noted that by supplying adjusting screws as 25 and 32 and indicators as 27a and 34 that the sound recording unit 24 and light exposure unit 31 may be adjustably positioned with respect to film 16 for recording sound onto a selected sound track as 51 after pre-exposure thereof, at the same time indicating the sound track being so treated.

Whereas the units as 24 and 31 have been shown as adjustable, they may be fixed and the sprockets 17, idlers 20a, and magazine 13 may be made movable with respect to camera housing 12a, an adjusting screw similar to screw 25 being arranged to position said parts transversely with respect to said fixed light valve units.

Whereas only one each of the light projecting units as 24 and 31 have been shown, a plurality of each of said units may be supported by wall 23 of camera 12 as more fully described in my Patent No. 1,990,754 granted February 12, 1935.

Whereas the rotation of shafts 8 has been shown to gradually cut in and out resistance in series with light source 35, said shaft may be made to move said light source to and from light slit 48 as more fully described in my Patent No. 1,991,630 granted February 19, 1935.

Cameras 1 and 12 may be suitably mounted on a common base 55, or if desired the sound camera 12 may be positioned remotely from the scene of action recorded by action camera 1 each camera having independent operating motors inter-connected for synchronous operation thereof.

It is to be understood that when camera 1 is photographically recording action, the camera 12 may be simultaneously recording the sound accompanying the action, said actions more generally comprising scenes which are faded in and out as a complete continuous record forming part of a motion picture production.

This application forms a continuation in part application of my application, Serial No. 306,652, filed, September 18th, 1928.

What I claim is:—

1. In sound recording apparatus, a light sensitive film, means for advancing said film uniformly, means including a microphone and an energized circuit for producing modulated energy corresponding to sound directed into said microphone, means including a light valve actuated in response to said modulated energy for projecting modulated light corresponding to said sound onto a portion of said film for photographically recording a record of said sound thereonto, means including a fogging beam of light projected onto the same portion of said film onto which said modulated light is projected for light fogging said sound record portion, and means for varying the amount of light in said light fogging beam for selectively varying the degree of light fogging of said sound record portion.

2. In sound recording apparatus, a light proof film housing, a light sensitive film, means for advancing said film uniformly in said housing, an opening in said housing extending between the interior and exterior thereof, mating portions on the housing adjacent the opening therein, a light valve unit including a light source and a light valve actuated in response to modulated energy corresponding to sound for modulating the light from said source, mating portions on said unit in mating engagement with the mating portions on said housing for removably positioning said unit with respect to said opening, a light passage-way portion on said unit registering with said opening in said housing, and a light passageway therein for admitting the modulated light from said light valve to said advancing film for photographically recording a record of said sound thereonto.

3. In sound recording apparatus, a light proof film housing, an opening in said housing, a light sensitive film having a sound track thereon, means for advancing said film in said housing past said opening, means including a light valve actuated in response to modulated energy corresponding to sound for projecting modulated light through said opening onto said film for photographically recording said sound onto said sound track, and means including a second light source for projecting light onto said track before the sound is recorded thereonto by said light valve.

4. In sound recording apparatus, a light proof film housing having an opening therein, a light sensitive film, means for advancing the film in the housing, means including a light valve responsive to modulated energy corresponding to sound for projecting modulated light through the opening onto the film for recording sound onto a sound track on said film, means including a second light source for projecting light onto said track for the light fogging thereof independently of the exposure thereon produced by the light valve, and means for moving the sound recording means, the light fogging means and the film relatively transversely with respect to the advancement of the film during the recording of the sound thereon by the light valve means.

5. In sound recording apparatus, a light sensitive film having a sound track, means for advancing said film uniformly, means including a light source and a light valve actuated in response to modulated energy corresponding to sound for recording said sound onto said sound track as said film advances, means including a second light source for light fogging said sound track prior to recording said sound thereonto, a circuit including a source of energy for energizing said last named light source, and means for varying the amount of energy in said circuit to vary the degree of light fogging of said track before recording said sound thereonto.

6. In sound recording apparatus, a light sensitive film having a plurality of sound tracks, means including mechanism for advancing the film, means including a sound recording device operated in response to sound for photographically recording sound onto one track of the film as it advances, means for moving the film and the device relatively transversely with respect to the film movement during recording for recording the sound onto a selected track, means including a fogging device for photographically fogging a sound track as the film advances, and means for moving the fogging device and the film relatively transversely with respect to the film advancement during recording for fogging a selected track.

7. In sound recording apparatus, a light sensitive film having a plurality of parallel sound tracks, means including mechanism for advancing the film, means including sound recording elements for photographically recording sound onto a track as the film advances, means for moving the sound recording elements and the film relatively transversely with respect to the film advancement for recording the sound onto a selected track, and means including light fogging elements for photographically fogging a track as the film advances.

8. In sound recording apparatus, a sound film having a plurality of parallel sound tracks, means including mechanism for advancing the film, means including a recording device for photographically recording a sound record onto one track during the advancement of the film, means for moving the device and the film relatively transversely with respect to the movement of the film for recording the sound on a selected track, means including a fogging device for photographically fogging a sound track as the film is advanced, means for moving the fogging device and the film relatively transversely with respect to the movement of the film during the advancement thereof for recording, and means for indicating the sound track selected for recording the sound thereon by the recording device.

9. In sound recording apparatus, a sound film having a plurality of parallel sound tracks, means including mechanism for advancing the film, means including a recording device for photographically recording a sound record onto one track as the film advances, means for moving the device and the film relatively transversely with respect to the movement of the film during recording for recording the sound on a selected track, means including a fogging device for photographically fogging a sound track as the film advances, means for moving the fogging device and the film relatively transversely with respect to the film movement during recording for fogging a selected track, and means for indicating the track selected for fogging.

10. In sound recording apparatus, a light sensitive film, a film housing having a plurality of light openings therein, means for advancing said film in said housing past said openings, a sound recording unit movable with respect to said housing and one of said openings, means on said unit including a light valve for projecting modulated light corresponding to sound through said opening onto said film, a fogging light projecting unit movable with respect to another opening in said housing arranged to project fogging light through said last named opening onto said film, means for moving the first named unit relatively to said housing and said opening correlated thereto for recording said sound onto a selected portion of said film as it advances, and means for moving said last named unit relative to said housing and said opening correlated thereto for light fogging a selected portion of said film as it advances.

11. In sound recording apparatus, a light sensitive film, a light proof film housing, means for advancing said film in said housing, means including a microphone and an energized circuit for producing modulated energy corresponding to sound directed into said microphone, an opening in said housing, a sound recording unit engaging said housing, means thereon including a light source and a light valve actuated in response to said modulated energy for projecting modulated light through said opening onto said film as it advances, another opening in said housing, and a light projecting unit engaging said housing, and means including a light source on said last named unit for projecting a constant beam of light onto the same area of said film onto which said modulated light is projected.

12. In sound recording apparatus, a light proof film housing, a light opening therein, a light sensitive film having a plurality of sound tracks, means for advancing said film in said housing for exposure to light from said light opening, a light valve housing having an opening exposed to said light opening in said film housing, means including a light valve on said light valve housing responsive to modulated energy corresponding to sound waves for projecting modulated light through the openings onto said advancing film, and means for moving said light valve housing relatively to said film housing, the relative movement thereof being transversely with respect to the advancement of said film whereby said modulated light may be projected onto a selected sound track as said film advances.

13. In sound recording apparatus, a light proof film housing, a light sensitive film having a plurality of sound tracks, means for advancing said film in said housing, a light opening in said housing positioned to project light therethrough onto said film, a light valve housing movably supported by said film housing having a light opening registering with the opening in said film housing, means including a light valve on said light valve housing responsive to modulated energy corresponding to sound waves for projecting modulated light through said openings onto said film, and means operated at will for moving said light valve housing and said film housing relatively transversely with respect to the advance of said film for projecting said modulated light onto a selected sound track of said film.

14. In sound recording apparatus, a light proof film housing, a light sensitive film having a plurality of sound tracks, means for advancing said film in said housing, a light opening extending between the interior and exterior of said film housing for admitting light therethrough onto said film, a light valve unit over said opening, means including a light valve responsive to modulated energy corresponding to sound waves for projecting modulated light through said light opening onto said advancing film to record a record of said sound waves thereonto, means on said film housing for slidably supporting said light valve unit thereon, the sliding movement of said unit being transversely with respect to the advance of said film, and means for slidably moving said unit to predetermined and variable selected transverse position with respect to said film for projecting the modulated light onto a selected sound track of said film.

15. In sound recording apparatus, a light proof film housing, a light sensitive film having a plurality of sound tracks, means for advancing said film in said housing, a light opening extending between the interior and exterior of said housing for admitting light therethrough onto said film, a light valve unit extending over said opening, means including a light valve responsive to modulated energy corresponding to sound waves for projecting modulated light through said light opening onto said film for recording said sound waves thereonto, means associated with said housing for slidably supporting said light valve unit, the sliding movement of said unit being transversely with respect to the advance of said film, means for slidably moving said unit to predetermined and variable selected transverse position with respect to said film for projecting said modulated light onto a selected sound track of said film, and indicating means visible from the exterior of said film housing for indicating the track selected for recording said sound waves thereonto.

16. In sound recording apparatus, a light proof film housing having a light opening therein, a light sensitive film having a plurality of sound tracks, means for advancing said film in said housing for exposure to said light opening, a light valve unit having an opening exposed to the light opening in said film housing, means including a light valve on said light valve unit responsive to modulated energy corresponding to sound waves for projecting modulated light through said openings onto said film to record said sound waves thereonto, means for moving said light valve unit relatively to said housing, said relative movement being transversely with respect to the advance of said film for projecting said modulated light onto a selected sound track on said film, and indicating means visible from the exterior of said apparatus for indicating the sound track selected for recording said sound waves thereonto.

17. In sound recording apparatus, a light proof film housing, a light sensitive film having a plurality of sound tracks, means for advancing said film in said housing, a light opening in said housing for admitting light to said film, fixed guide rails extending transversely with respect to the advance of said film, a light valve unit movable relatively to said opening, means including a light valve responsive to modulated energy corresponding to sound waves for projecting modulated light through said opening onto said film to record said sound waves thereonto, guide rails on said light valve unit matingly engaging said fixed guide rails, and means for positioning said unit at predetermined and variable fixed positions along said fixed rails for projecting said modulated light onto a selected sound track of said film as it advances.

18. In sound recording apparatus, a light proof film housing, a light sensitive film having a plurality of sound tracks, means for advancing said film in said housing, a light opening in said housing for admitting light to said film, fixed guide rails extending transversely with respect to the advance of said film, a movable light valve unit movable relatively to said opening, means including a light valve responsive to modulated energy corresponding to sound waves for projecting modulated light through said opening onto said film, guide rails on said light valve unit matingly engaging said fixed guide rails and slidable thereon, and means for sliding said unit to predetermined and variable fixed positions with respect to said light opening for projecting said modulated light onto a selected track of said film as it advances.

19. In sound recording apparatus, a light sensitive film having a plurality of sound tracks, mechanism for advancing said film, means including a recording device for photographically recording a sound record onto a track of said film as it advances, means for moving said device and said film relatively transversely with respect to the advance of said film for recording said sound onto a selected sound track, means including a fading device for photographically fading the sound record as said film advances, and means for moving said fading device and said film relatively transversely with respect to the advance of said film for fading the sound record of a selected sound track.

20. In sound recording apparatus, a light sensitive film having a plurality of sound tracks, mechanism for advancing said film, means including a recording device for photographically recording a sound record onto a track of said film as it advances, means for moving said device and said film relatively transversely with respect to the advance of said film for recording said sound onto a selected sound track, means including a fading device for photographically fading the sound record as said film advances, and means for indicating the track selected for recording the sound thereonto.

21. In sound recording apparatus, a light sensitive film having a plurality of sound tracks, mechanism for advancing said film, means including a recording device for photographically recording a sound record onto a track of said film as it advances, means for moving said device and said film relatively transversely with respect to the advance of said film for recording said sound onto a selected sound track, means including a fading device for photographically fading the sound record as said film advances, and means for indicating the sound track selected for fading by said fading device.

22. In sound recording apparatus, a light sensitive film having a plurality of sound tracks, mechanism for advancing said film, means including a recording device for photographically recording a sound record onto a track of said film as it advances, means for moving said device and said film relatively transversely with respect to the advance of said film for recording said sound onto a selected sound track, means including a fading device for photographically fading the sound record as said film advances, means for indicating the track selected for recording the sound thereonto, and means for indicating the track selected for fading by said fading device.

23. In sound recording apparatus, a light sensitive film, means for advancing said film uniformly, means including a sound recording device for photographically recording a sound record of sound onto said film as it advances, means including a fogging light source for projecting light onto the same area of said film onto which said sound record is recorded, and means controlling said fogging light means independently of said sound for effecting projection of a constant light onto certain portions of said area and a projection of variable light onto certain other portions of said area as said film advances.

24. In sound recording apparatus, a light sensitive film, a light proof film advancing housing, a light proof film reel housing having film feed and film take-up reels therein for supporting said film, said film reel housing being detachably supported by said film advancing housing, registering openings in said housings through which said film take-up reel, a light opening in said film advancing housing, means for advancing said film from said film feed reel past said light opening to said film take-up reel, a light valve unit covering said light opening having a light projecting opening registering with the light opening in said film advancing housing, a source of constant light projected through said light projecting opening into said film, means including a light valve actuated in response to modulated electrical energy corresponding to sound waves for modulating said constant projected light before reaching said film through said light opening, a second opening in said film advancing housing for exposing light to said film, and a second light source exterior of said film advancing housing for projecting light through said last named opening onto said film.

25. In sound recording apparatus, a light sensitive film, a light proof film advancing housing, a light proof film reel housing having film feed and film take-up reels therein for supporting said film, said film reel housing being detachably supported by said film advancing housing, registering openings in said housings through which said film passes in advancing from said film feed reel to said film take-up reel, a light opening in said film advancing housing, means for advancing said film from said film feed reel past said light opening to said film take-up reel, a light valve unit covering said light opening having a light projecting opening registering with the light opening in said film advancing housing, means including a light valve actuated in response to modulated electrical energy corresponding to sound waves for projecting modulated light through said light projecting opening for photographically recording a sound record of said sound waves onto said film as it advances, and means including a source of light for light exposing the area of the film onto which said sound is recorded independently of the exposure thereof effected by said modulated light during said film advancement.

OSCAR A. ROSS.